INVENTOR:
ETTORE BURALLI
By
Squire + Olcott
ATTYS.

INVENTOR:
ETTORE BURALLI
By Squire & Olcott
ATTY'S.

Sept. 21, 1965 E. BURALLI 3,206,962

MACHINE FOR SHEARING AND WINDING OF A MAGNETIC STRIP TO FORM STATORS FOR ELECTRIC AXIAL GAP MOTORS

Filed Dec. 26, 1961 8 Sheets-Sheet 3

INVENTOR:
ETTORE BURALLI
By Squire & Olcott
Atty's.

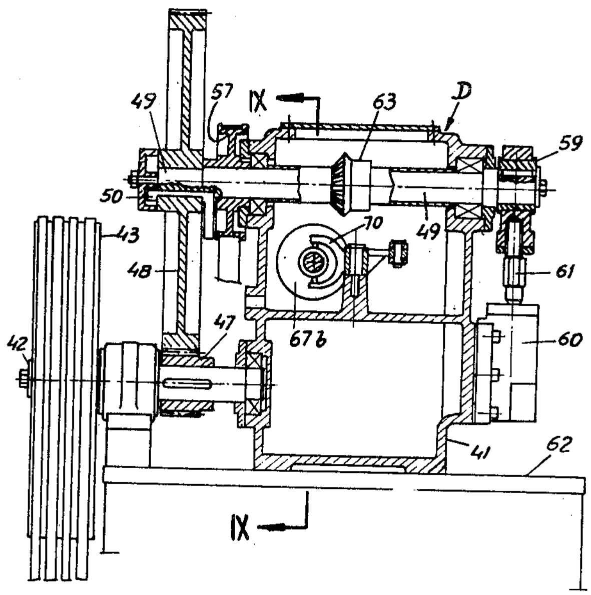
Fig. 8
Fig. 9
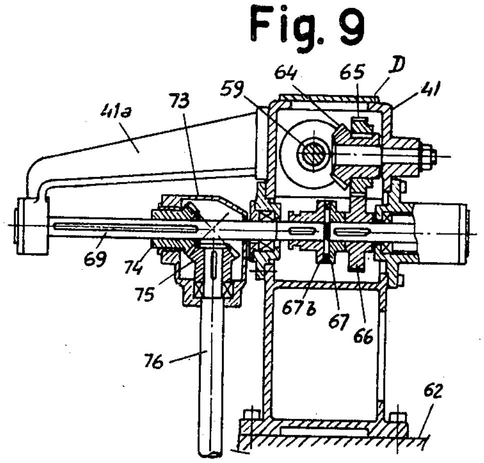
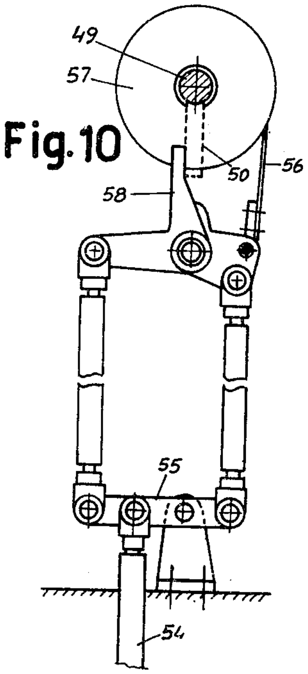
INVENTOR:
ETTORE BURALLI
By Squire + Olcott
ATTY'S.

INVENTOR:
ETTORE BURALLI
By Squire + Olcott
ATTY'S.

INVENTOR:
ETTORE BURALLI
By
Squire & Olcott
ATTY'S.

Sept. 21, 1965 E. BURALLI 3,206,962

MACHINE FOR SHEARING AND WINDING OF A MAGNETIC STRIP TO FORM STATORS FOR ELECTRIC AXIAL GAP MOTORS

Filed Dec. 26, 1961 8 Sheets-Sheet 7

ETTORE BURALLI by E. M. Squire his attorney

Sept. 21, 1965 E. BURALLI 3,206,962

MACHINE FOR SHEARING AND WINDING OF A MAGNETIC STRIP TO FORM STATORS FOR ELECTRIC AXIAL GAP MOTORS

Filed Dec. 26, 1961 8 Sheets-Sheet 8

ETTORE BURALLI by E. M. Squire his attorney 3,206,962

MACHINE FOR SHEARING AND WINDING OF A MAGNETIC STRIP TO FORM STATORS FOR ELECTRIC AXIAL GAP MOTORS

Ettore Buralli, Florence, Italy, assignor to Remital Societa per Azioni Studio e Realizzazioni Elettromeccaniche, Florence, Italy, a corporation of Italy Filed Dec. 26, 1961, Ser. No. 162,108
Claims priority, application Italy, Jan. 3, 1961, 642,933
5 Claims. (Cl. 72—27)

The invention relates to a machine which is designed to form strip coils with notched edge portions aligned to define radial grooves in the end faces of the coils and more particularly the machine is designed to form the stator cores by means of the system of winding a magnetic strip and providing progressively increasingly spaced edge notching of the strip material as it is wound in such a manner that the notched portions in the several turns are radially aligned to define the radial grooves, and also to form suitable seats for connection plugs of the different turns. Stator cores produced by the machine are suitable for use in axial gap induction motors of the type disclosed in my copending application Serial No. 146,059 filed October 3, 1961, now abandoned. The machine is designed also for other equivalent uses.

In the machine substantially according to the invention there is provided a strip payoff unit, a shearing unit combined with motor means, and a winding unit driven by the same motor means, which determine the drive of the shearing; said winding unit involves a unit which is progressively moved either in a direction orthogonal to the traverse direction of the sheared strip, which is wound, or in a direction parallel to said traverse or feed, with such an arrangement whereby there is a compensation either for the variation of the tangency position of the strip being wound which otherwise would be obtained by effect of the increase of the radius of the coil being formed, or for the variation of the inter-distance between the sheared portions, which must correspond in the subsequent turns, in consequence of the increase of said radius.

In the embodiment, there is provided a unit or mechanism slidable parallelly to the direction of the strip being wound and transiting under the shears, and on said unit a carriage which is orthogonally moved and thus perpendicularly to the tangential winding direction of the coil being formed, the two slidable units being driven dependently upon the number of cycles or stages the machine effects and which correspond to the shearing strokes of the shearing press. In particular, there are provisions to determine said movement with a law on intermittency such as to obtain the stopping of the strip required by the coil being formed during the shearing, and the return of said strip when the shearing tools are raised. In order to effect this, there may advantageously be arranged a grooved or splined shaft which rotates with the timing of shift of the shearing and which is parallel to the strip feed or traverse direction, said shaft supplying the motion which is extended to a carriage movable orthogonally to the strip feed direction on ways borne by a second carriage mounted on the frame connected to the shears frame and parallelly slidable to the strip feed direction; on said first carriage Geneva cross means or equivalent are mounted and said means determine the intermittent drive of the winding coil of the sheared strip, and said intermittent motion device also determines through a threaded shaft parallel to the sliding ways of the first carriage, the movement of said carriage and the control of the movement of the second carriage.

Means are provided for the manual traverse and for the return into the depart positions.

Moreover there are provided also means for the straightening of the strip, in general formed by a series of straightening rollers which forms a rolling mill, in which the strip is subsequently bent in different directions to lose the bending of the paying-off coil.

The sheared strip coil winding drum is set up with recording means of the minimum winding diameter and is provided with a stop tooth slightly projecting from the minimum winding diameter, said tooth being adjustable and being designed to engage the strip end at the start of a winding operation. Moreover a second tooth is provided on said winding drum and said tooth at each revolution of the coil being formed is moved by an amount which corresponds to the thickness of the strip which forms the turn, in such a manner that the tooth at each turn grazes above the last formed turn to engage the strip in the subsequent turn shearing and allow the alignment thereof with the sheared portions of the previous turns.

Means are still provided to assure a constant traction stress from the paying-off coil.

The invention will be better understood by following the specification and the acompanying drawing which illustrates an embodiment of said invention.

In the drawing:

FIGS. 8 and 9 illustrate a transversal section taken along the line VIII—VIII of FIG. 1 and a local section taken along the line IX—IX of FIG. 8;

FIG. 10 illustrates a detail of the main control system of the machine, connected to a pedal;

Figure 2:
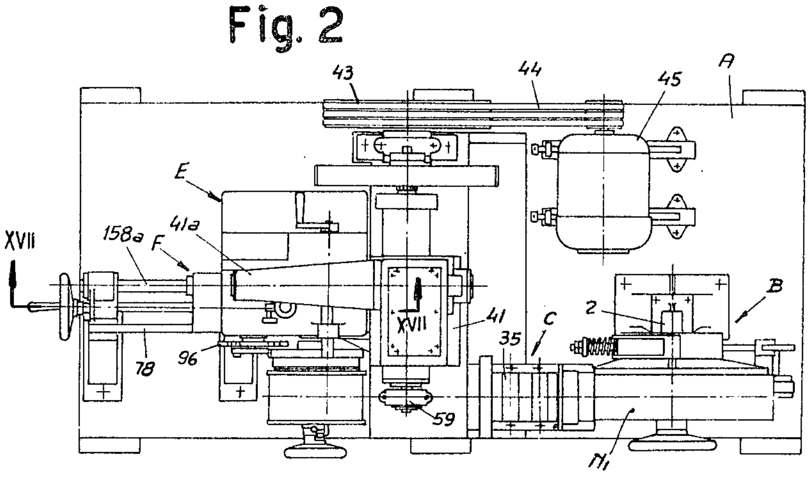
Figures 11, 12, 13, 14, 15, 16:
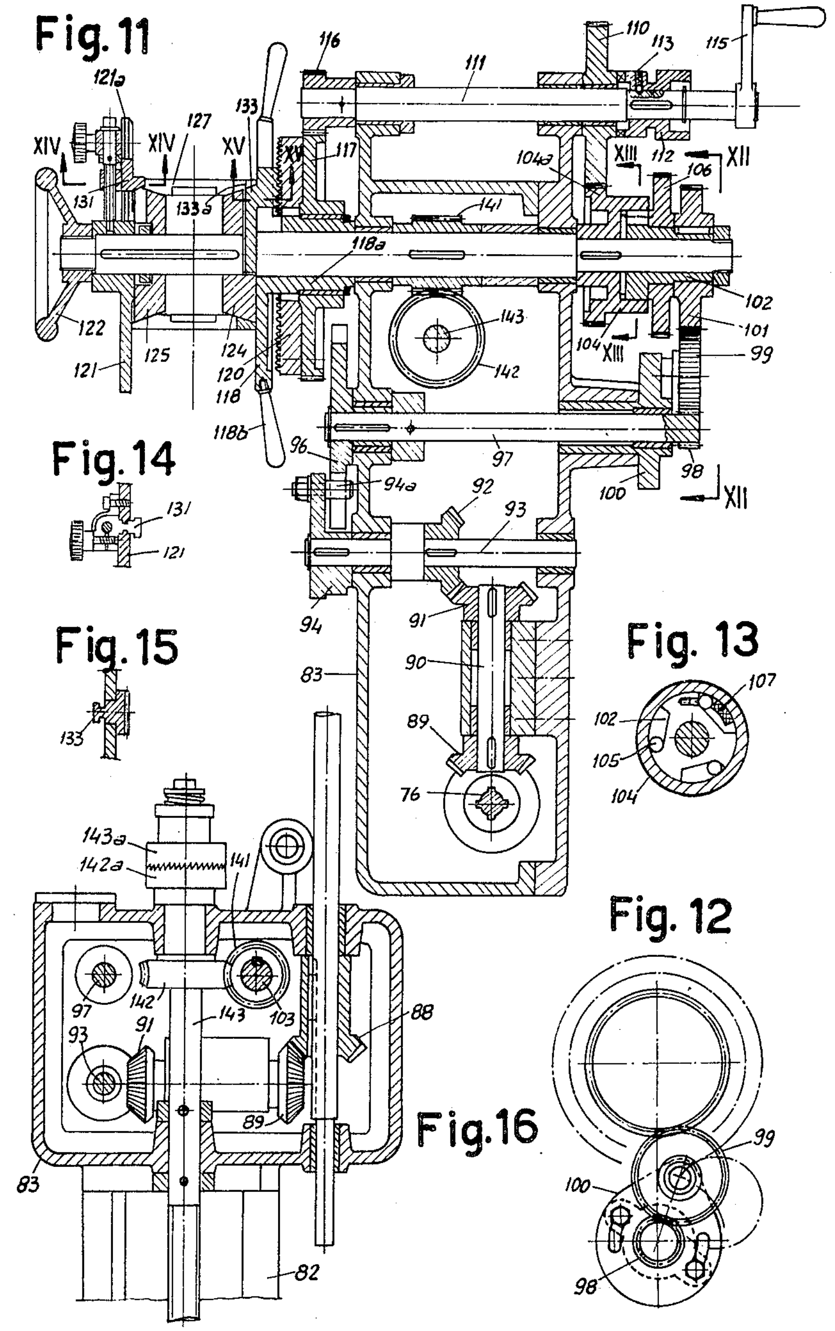
FIG. 11 illustrates a diagrammatical section taken along a broken line approximately corresponding to the line XI—XI of FIG. 1.
Figures 17, 18, 19:
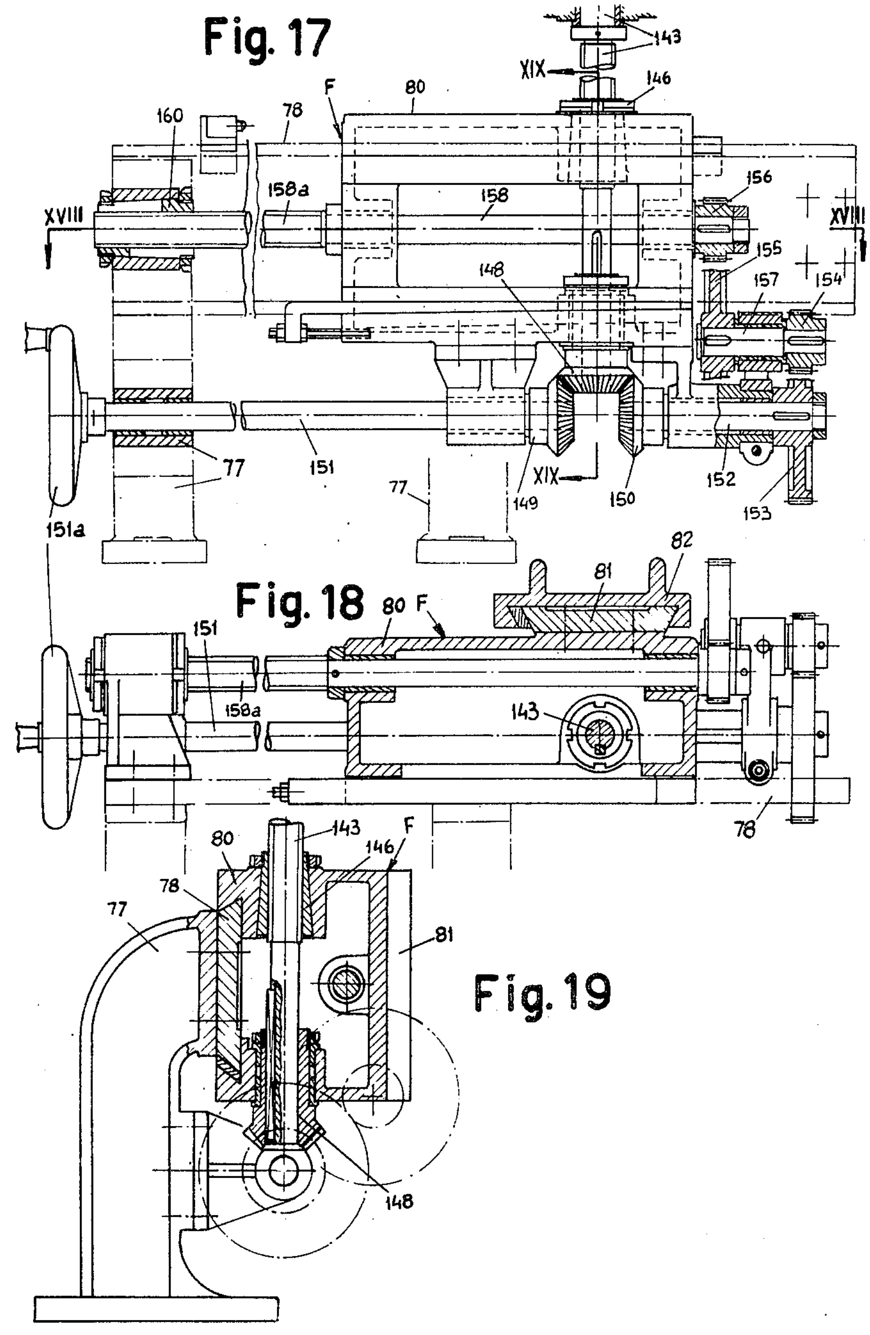

FIGS. 12, 13, 14 and 15 illustrate local sections taken along the lines XII—XII; XIII—XIII; XIV—XIV; and XV—XV of FIG. 11, illustrating some details of an upper carriage;

FIG. 16 illustrates a diagrammatical vertical section of said upper carriage;

FIGS. 17, 18 and 19 illustrate a lower carriage, respectively in a section approximately corresponding to the line XVII—XVII of FIG. 2, in a section taken along the line XVIII—XVIII of FIG. 17 and a section taken along the line XIX—XIX of FIG. 17.

Figure 20:
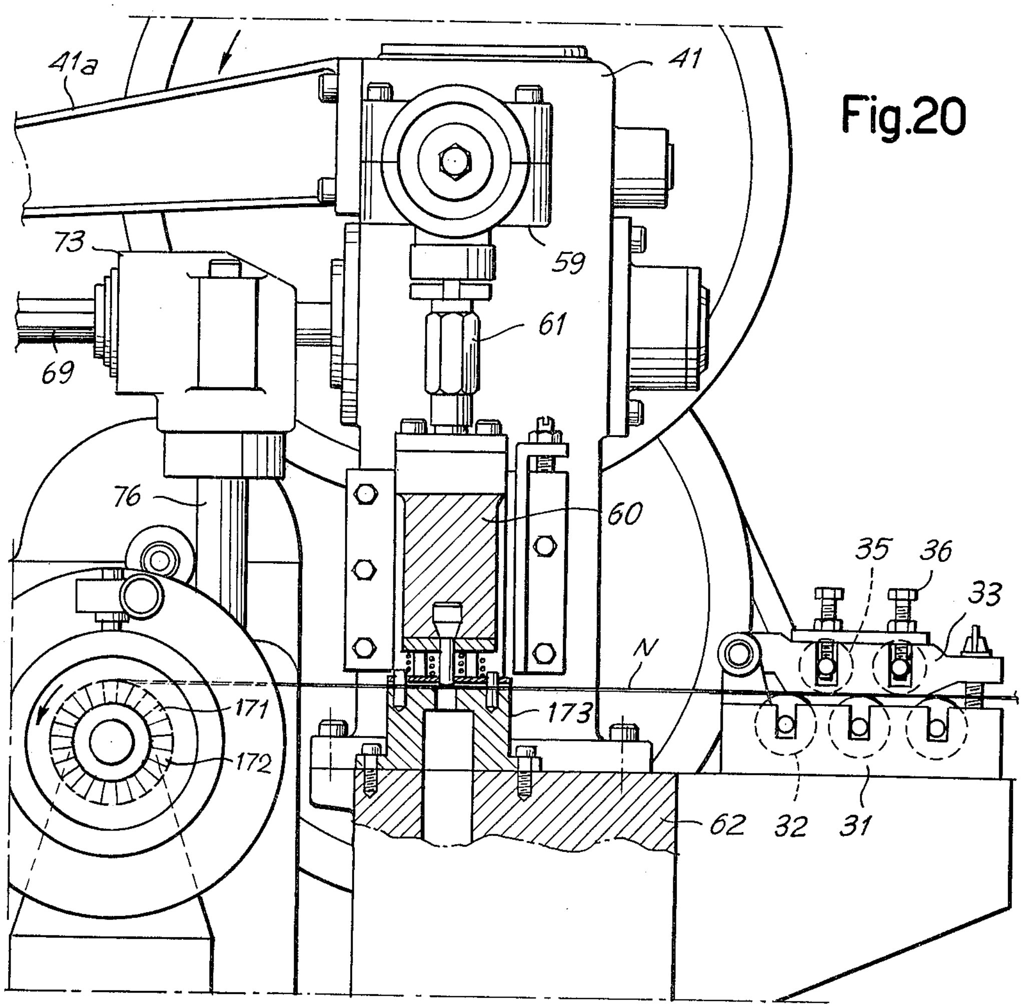

FIGURE 20 is an elevational view, partly broken away and shown in section, illustrating the strip strightening, punching and winding portions of the machine including an end view of a partially completed stator core winding.

Figure 21:
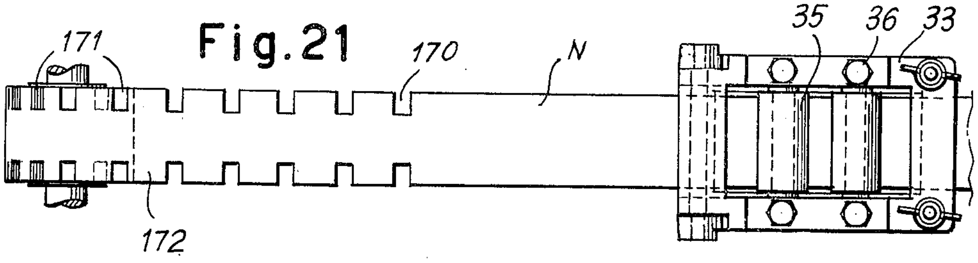

FIGURE 21 is a plan view showing the straightened strip before and after the punching of the notches.

Figure 22:
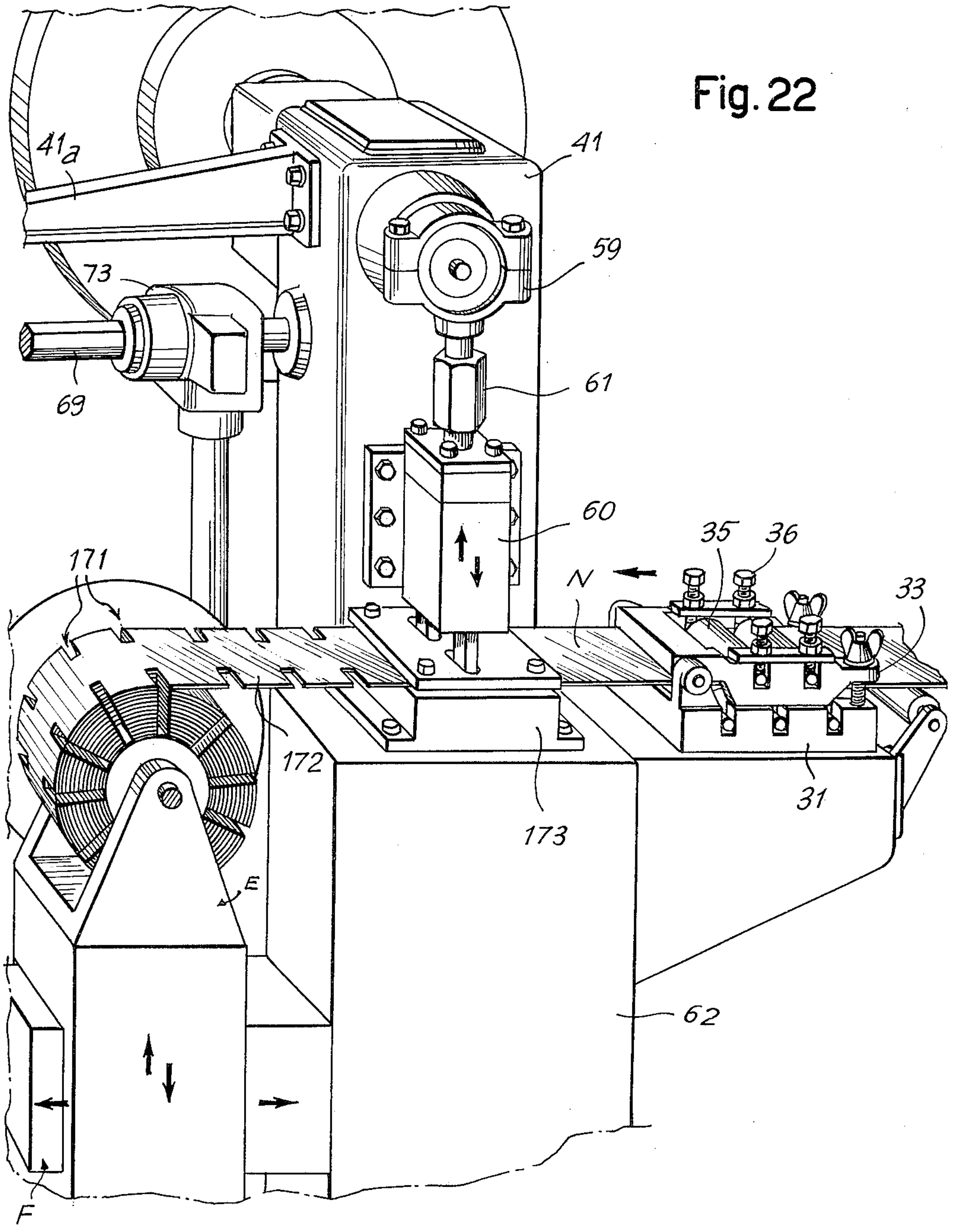

FIGURE 22 is a diagrammatic perspective view showing the straightening, punching and winding portions of the machine with a partially completed stator winding in the process of being wound.

Figure 1:
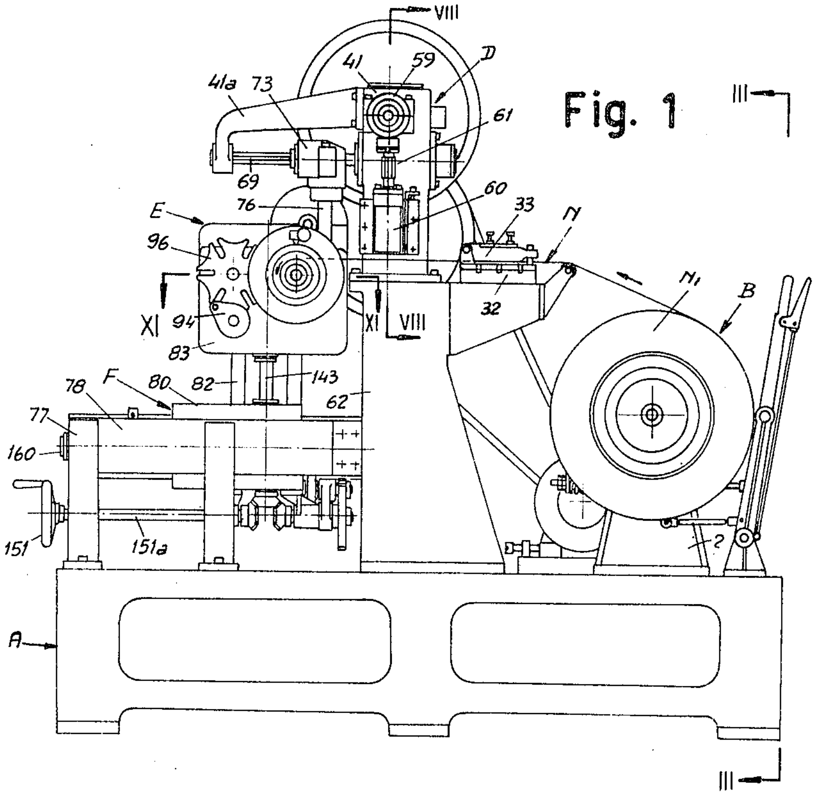
FIGS. 1, 2 and 3 illustrate a side view, a plane view and a view taken along the line III—III of FIG. 1, of the machine.
Figures 3, 4:
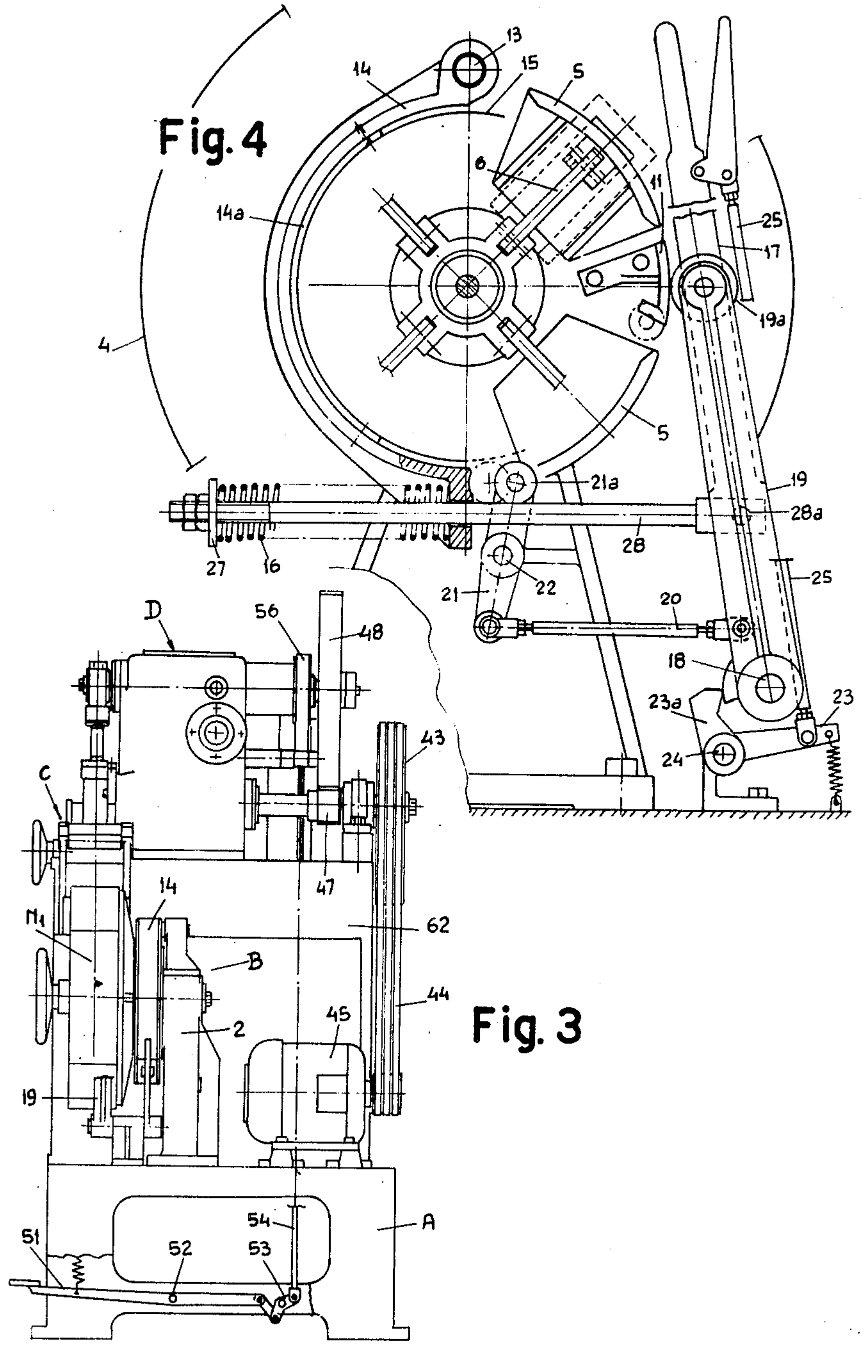
FIGS. 4 and 5 illustrate a side view and a demonstrative transversal section of the strip payoff unit.

According to what is illustrated in the accompanying drawings, with a particular reference to FIGS. 1 to 3, on a base A there is provided a pay-off unit B (on the right hand side looking at FIGS. 1 and 2), a straightening train C, a turret D forming the main control group of the press, an upper carriage E and a lower carriage F, the upper carriage E being slidable on vertical ways borne by the lower carriage F which is slidable on horizontal ways; the upper carriage E carries the winding coil.

Figure 5:
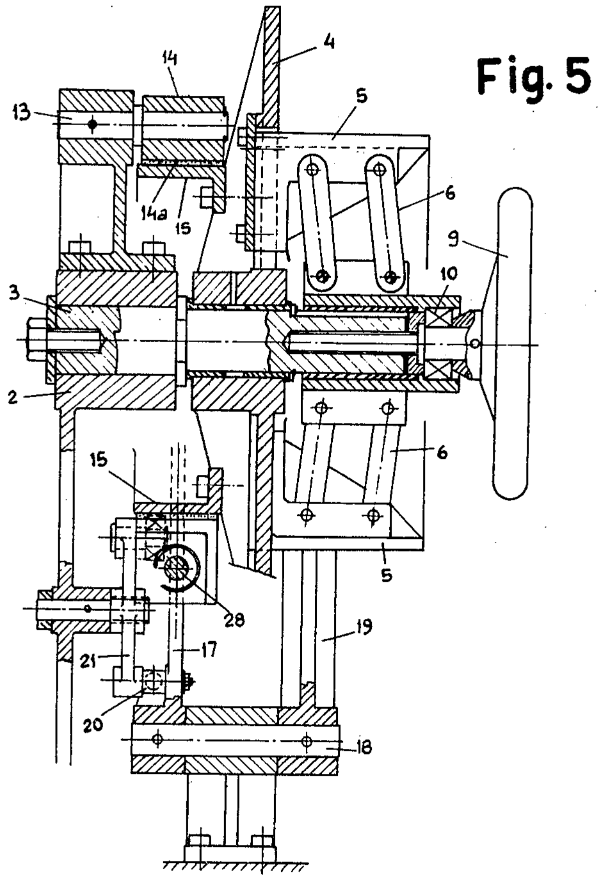

The strip payoff unit (particularly see FIGS. 4 and 5) involves a drum in which the strip coil to be sheared is inserted and locked, and a drum braking system which allows to have a constant payoff tension of the strip forwarded towards the press. On a frame 2 there is mounted a supporting shaft 3, on which a disc 4 rotates idly; on this disc there are assembled four sectors 5, which are capable of radially sliding on the disc 4 through suitable sliding ways. The simultaneous radial movement of the four sectors is determined through connecting rods or stems 6 by a single sleeve 7 slidable on the axle 3 through the control of a handwheel 9, which may be screwed on the shaft 3 and actuates the sleeve 7 through a bearing 10. This expansion movement of the sectors permits the locking of the coil on the drum, the coil being invested on the assembly of the sectors 5, previously pulled towards the drum axis. A stop tooth or pawl 11 serves to engage the inner end of the strip.

On the frame 2, through a pin 13, the wedge 14 of the brake, provided with a friction material strip **14*a*, is linked; said brake acts on a drum 15 integral to the payoff drum 4. The stress for the braking is given by a spring 16 which acts on the free end of the brake wedge 14, opposite the linkage 13. In order to determine the slackening of the brake and the adjustment of the brake pressure dependently upon the instant payoff diameter there is provided an operational lever 17 linked through a pin 18 to the stationary frame and integral through said pin to a feeler lever 19 provided with a contact roller 19*a*, capable of bearing on the coil being paid-off. The lever 17 through the linkage 20, 21 and the rocker arm lever 21 (linked in 22 to the stationary frame) may determine the slackening of the wedge or shoe 14 by the action of the roller 21*a* in a direction opposite to the spring 16; this is effected when the lever 17 is carried to be engaged with the tooth 23*a* of a lever 23 linked in 24 and actuable through a stay rod 25, operated by the person gripping the lever 17 for the release. Engaging the lever 17 to the tooth 23*a*, one determines the slackening of the brake, while by releasing the lever from the tooth 23*a*, one begins the braking action operated by the pressure of the spring 16**.

The pressure of the spring 16 is adjusted according to the diameter of the paying-off coil; and for this purpose, the spring 16 re-acts on a shoulder 27 borne by a stay rod 28 linked in **28*a* to the lever 17; as it is integral to the feeler 19, 19*a*, the lever 17 instantly assumes a position dependent upon the maximum instant diameter of the coil being paid-off and determines, with the reduction of the diameter for the payoff, a gradual reduction of the compression of the spring 16** and thus of the braking action, to keep the coil traction stress constant.

Figure 6:
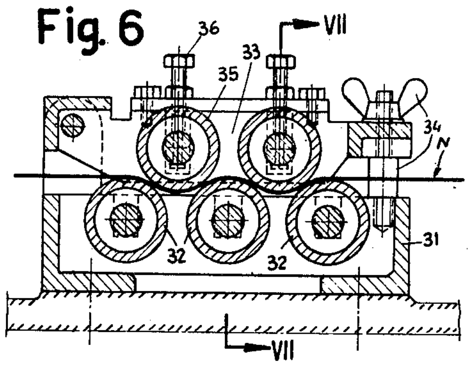
FIGS. 6 and 7 illustrate a detail in the longitudinal sections and according to the line VII—VII of FIG. 6.
Figure 7:
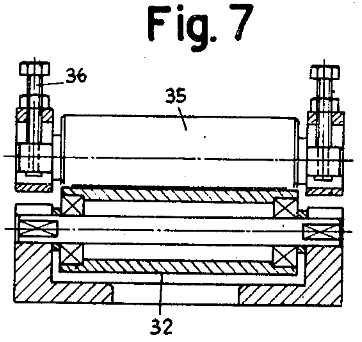

The straightening train unit indicated by C and particularly illustrated in FIG. 6, is designed to determine the elimination of the curving or bending which the strip assumes in the unwinding coil. For this purpose, on a frame 31 there are mounted three rollers 32, while on an assembly 33 (linked in **33*a* to the frame 31 and engaged on the opposite side in an adjustable manner to said frame through a screw pin 34) there are mounted two rollers 35, adjustable in their position in a per se known manner, for instance, through adjusting screw 36. The strip N which is paid-off from the coil $N_1$, is passed between the rollers 32 and 35, the assembly 33 being raised; after the re-lowering of the assembly 33**, the strip transiting from the straightening unit is subjected to multiple deformations or strains which make the same strip lose its initial bending, so as to then forward it to the shearing under the press.

The shearing press unit, indicated by D in FIGS. 1 to 3 (and more detailedly illustrated in FIGS. 8, 9 and 10) includes, on a turret frame 41 a shaft 42 to which a sheave 43 is integral, said sheave driven by an assembly of belts 44 by a motor 45 (especially see FIG. 2). Also a pinion 47 is integral to the shaft 42 and said pinion meshes a gear 48, also having the function of a flywheel, which is mounted on a shaft 49, to which it is made integral through a key 50; the key may be rotated to determine the angular matching or coupling between the flywheel 48 and the shaft 49. In order to effect this, there is provided a control through a pedal 51 which is linked 52 to the frame A (see FIG. 3), and which through a transmission linkage 53 and a stay rod 54 acts (particularly see FIG. 10) on a rocker arm lever 55, having the dual purpose of determining alternatively on one side the slackening of the band brake 56 acting on the pulley 57, mounted on the shaft 49, and on the other side, through an arm 58, a control on the key 50 to determine the coupling between the flywheel 48 and the shaft 49. At the end of the shaft 49, opposite the one bearing the flywheel 48, there is provided a collar eccentric 59 which imposes a reciprocal motion to a slide 60 through a stay rod 61. On the slide 60 the shearing unit is assembled and said unit is designed to punch (see FIGS. 20, 21 and 22) either the notches 170 which define the radial grooves 171 in the wound coil 172, or alternatively central holes (not shown) in the strip; the shearing unit co-operates with the die 173 fixed on the main frame 62 on which the turret 41 is mounted.

The shaft 49 which determines the control of the shearing, is provided with a conical gear 63 which meshes a bevel gear 64 (See FIG. 9), which is integral to a gearwheel 65, meshing a gearwheel 66, integral to the driving member **67*a* of a front clutch, whose driven member 67*b* is slidable but rotarily coupled to a shaft 69; the member 67*b* is controllable through a fork 70 to release the drive between the shaft 59 and the shaft 69, which transmits the motions to the group of the carriages E and F and thus to the winding coil; this in order to make the motions of the two carriages E and F independent with respect to the press and vice-versa. The shaft 69 is carried by an arm 41*a* of the turret 41 and on the uncovered portion thereof a unit 73, inclusive of a conical gear 74, slidably coupled but angularly integral to the shaft 69, may run thereon; the motion of the drive shaft 69 is transmitted, through the gear 74 and the gear 75 to a vertical shaft 76**, which is thus apt to follow the motions of the upper carriage E borne by the horizontal carriage F, while it determines the drive of the members carried by the upper carriage E by effect of a slidable coupling.

A horizontal slidable guide or way 78 (especially see FIGS. 18 and 19) is formed on the frame A, and in particular on structures 77, built-in there; on said guide there is a slide 80 forming the horizontal carriage F. Said carriage bears a pair of vertical ways or guides 81 which are designed to guide the arms 82 integral to the box 83 which forms the upper carriage. Therefore, the upper carriage may move, either horizontally following the lower carriage, or vertically on its own guides or ways with respect to the lower carriage.

The shaft 76 penetrates into the box 83 and through a pair of conical or bevel gears 88, 89, a shaft 90 and a second pair of gears 91, 92, transmits the rotational motion to a shaft of a plate 94 controlling a Geneva cross device; said plate 94 carries a pin **94*a* which acts with the proper Geneva cross 96. The latter is mounted on the shaft 97, which carries, at the end opposite to the Geneva cross 96, a pinion 98; the latter meshes a wheel 99 carried by an arm 100 (see FIG. 12) to form a quadrant capable of meshing one or the other of the replacable gears, mounted in the position of the gear 101 on a sleeve 102; the sleeve 102 is freely mounted on the shaft 103, on which the drum of the wound coil of the strip, already sheared, is keyed, and there is a coupling between said sleeve and said shaft 103, the replaceable gear 101 allows to modify the gear ratio between the Geneva cross and the shaft 103. In order to determine the coupling between 102 and 103 there is provided a member 104 which presents (also see FIG. 13) an inner cylindrical track on which rollers 105 of a free wheel device, formed between the sleeve 102 and the member 104 which is keyed on the shaft 103, may contact. Through this arrangement the shaft 103, independently upon the control operated by the Geneva cross, may be operated. In order to mesh the sleeve 102 with the shaft 103 without any angular shifts, after a determined angular position has been sought for the shaft 103, there is provided a knob control or the like, not visible in the drawing, through which it acts on a gear 106, free on the sleeve 102, which gear carries the arms 107 (see FIG. 13) designed to carry the rollers 105 in a wedge engagement such as to lock the sleeve 102 rotarily with the member 104 and thus with the shaft 103**.

The member 104 also forms a gear 104*a* which meshes with a gear 110 idly mounted on the shaft 111 parallel to the shaft 103. A front clutch is arranged between said gear 110 and a slidable sleeve 112 rotarily coupled to the shaft 111 and capable of assuming positions of engagement and release with the gear 110, with the aid of a resilient pin 113. The shaft 111 may be controlled by hand through a crank 115. The shaft 111 carries, at the end opposite that of the crank 115, a geared pinion 116, which meshes a gearwheel 117; said gear is carried in an idle manner on the hub 118*a* of a flange 118 forming part of the winding drum of the sheared strip coil (hereinafter described); said gearwheel 117 is integral to a disc 120, which presents in the front a spiral gear for hereinafter described purposes. The member 118, 118*a* is integral to the shaft 103, while the assembly 117, 120 is free on the hub 118*a*.

A second disc 121 is mounted at the end of the shaft 103, rotarily coupled therewith but slidable with respect thereto through the control of a handwheel 122. Two cones 124 and 125 are mounted between the two discs 118 and 121 to engage a locking ring 127 which is provided with a plurality of alternate slots and which thus is expanded under the pressure of the cones 124, 125; therefore, rotating the handwheel 122, the latter urges the flange 121 and the pressure cone 125 and the latter, advancing, pushes the locking ring 127 on the other cone 124 and this on the disc 120, which forms a fixed shoulder with respect to the shaft 103; said members serve to vary the initial diameter and to unlock the wound coil. On the disc 121 a tooth 131 is slidably engaged and said tooth has a projecting profile corresponding to the notch which is formed on the edge of the strip for the forming of the grooves; said tooth 131 is adjustable on a radial sliding way 121*a* cut in the disc 121, and is moved along said way in an appropriate manner to be locked in the desired position (see FIGS. 11 and 14). This tooth 131 may be adjusted in such a manner as to slightly project from the locking ring 127, which defines the minimum winding diameter of the strip; said tooth has the function of entraining the strip during the rotation of the coil and thus determines the longitudinal movement of the strip under the shearing unit and its unwinding or payoff from the payoff unit B.

On the other disc 118, of the winding drum, a unit 133 slides in a radial manner and said unit forms a tooth 133*a* and presents a front rack which is engaged in the spiral teeth of the disc 120. At each revolution of the winding of the coil, the tooth 133*a* is transversed by an amount substantially corresponding to the thickness of the wound strip, whereby the tooth 133*a* always engages the turn being wound, assuring the alignment of the shearings formed for the set up of the single grooves. The amount of the radial traverse of the tooth 133, 133*a* is determined by the ratio between the gears 117, 116 and 110, 104*a*. Through the crank 115 and releasing the engagement between the members 112 and 110, it is possible to determine the quick movement of the tooth 133*a* and its return into the initial position.

Releasing the free wheel coupling between the members 104 and 102, it is possible to determine the quick rotation of the coil winding drum, for instance, acting on a handwheel 118*b*, formed by the disc 118.

A worm 141 is fast on the shaft 103 and meshes with a worm-wheel 142 fast on a vertical shaft 143. Said shaft presents a threaded portion which is engaged in a threaded bushing 146 (see FIGS. 17 and 19); therefore the rotation which through the Geneva cross is imposed to the shaft 143 by effect of the movements of the shaft 103, determines the vertical movements of the vertical carriage E provided with the ways 82 on the guide means 81 of the lower carriage F. Therefore a vertical movement of the upper carriage E is obtained. The arrangement is such that, with the progressive winding of the several turns of the strip coming from the straightener and the shears, one maintains a substantially horizontal trajectory, however constant, of the strip portion tangent to the winding spiral on the drum 118, 127, 121 while the assembly of the upper carriage E is horizontally moved together with the lower horizontal carriage F. The vertical shaft 143 is slidably engaged also to a sleeve 148 (see FIGS. 17, 19), which forms a bevel gear which meshes two gears 149 and 150. The gear 149 is integral to a manual operation shaft 151, which is controllable by an external handwheel 151*a*. The gear 150 is integral to a shaft 152 which through gears 153, 154, 155, 156 and through the aid of a transmission shaft 157, having a movable axis, transmits the motion to a horizontal shaft 158, provided with a threaded portion 158*a*. The threaded portion 158*a* is engaged to a conical threaded bushing 160, borne by the structure 67 fixed to the machine base. The gears train 153 to 156 allows a variation of the gear ratio between the shaft 158 and the shaft 152 and definitively the shaft 143.

The machine assembly obviously operates departing from the main shaft 49 of the shears, and at every revolution of the shaft a shearing cycle is effected and an advance or traverse of the Geneva cross device is determined. This Geneva cross device determines the movement either of the shaft 103 of the winding drum of the sheared strip coil and of the associated connected systems (such as the stop tooth 133*a*), either the movement of the vertical shaft 143 for a fraction of a revolution, whereby the upper carriage E and therewith the coil being wound is lowered by an amount equal to the thickness of the strip being worked, to always maintain in the same trajectory the strip N which is wound on the coil. The same rotation of the shaft 143 determines at every trip, a movement of the lower carriage and thus also of the upper carriage and of the coil being formed in the horizontal direction; the value of this movement varies with the variation of the initial internal diameter of the stator core and of the number of grooves to make in the stator being worked and of the thickness of the sheet used. This correction determined by the horizontal movement is necessary for the fact that the wound strip has its inherent thickness and thus on the inner circumference of a turn, the grooves result to be spaced one another by a certain distance, while on the outer circumference, which is larger as a development, the strip undergoes a stretching and thus the interval or gap between one groove and the outer results to be peripherically larger. The vertical movement combined with the horizontal movement compensate for these cyclical variations of the return of the strip, amending the longitudinal amount of strip which transits under the shears between one stroke and the other. The return tripping movement of the strip determined by the Geneva cross 96 is determined during a stage of the cycle wherein the shearing punches of the unit 60 are raised, whereby they do not interfere in the strip movement.

The reutrn movement of the carriages E and F is obtained by control of the handwheel 151*a* and the movement is allowed by arranging a coupling between the pinion 142 and the shaft 143, which only allows the traverse or advance movement by control of the worm screw 141 while the reversed rotation of the shaft 143 is allowed with a movement departing from the lower carriage, by effect of said coupling. The coupling is formed by two members 142*a* and 143*a*, mutually coupled through inclined teeth, integral respectively to the members 142 and 143, and stressed by seizing resilient means, the seizing being effected only with the rotation in one direction for the inclination of the teeth, which, instead, jump in the movement of the reversed direction, imposed by the shaft 143.

It is intended that the drawing only illustrates an embodiment given only as a practical demonstration of the invention, said invention being in conditions as to be varied in the forms and arrangements, without however departing from the scope of the concept which informs said invention. For instance, one may arrange a single slide carrying the winding coil being formed, slidable on variably inclined rectilinear ways.

What I claim is:

1. A punching and coil winding machine comprising: strip feeding means for deliverying a strip of sheet material to be wound into a coil; punching means for forming a longitudinally spaced series of apertures in said strip; winding means receiving said strip from said feeding means after passage through said punching means; and control means progressively increasing the longitudinal spacing of said apertures along said strip to cause said apertures to lie in radial alignment as the apertured strip is wound to form a coil.

2. A machine according to claim 1, further comprising radially displaceable guide means carried by said winding means and means for progressively advancing said guide means radially outwardly during the winding of said strip to engage successively in the recesses of the outermost layer of said strip being wound to form said coil.

3. A machine according to claim 1, wherein said feeding means delivers said strip from a coiled supply thereof, said machine further comprising straightening means intermediate said feeding means and said punching means for removing the inherent curvature of said strip after said strip has been uncoiled from said supply and before said strip enters said punching means.

4. A machine according to claim 1, wherein said control means comprises first and second carriage means jointly supporting said winding means, said carriage means being displaceable along mutually perpendicular axes both of which are perpendicular to the rotational axis of said winding means, and intermittently operated means controlled in synchronism with said punching means, said intermittently operated means displacing one of said carriage means to maintain said strip received through said punching means tangent to the underlying layer of said coiled strip as it comes in contact therewith, said intermittently operated means displacing the other of said carriage means to progressively move said winding means away from said punching means during intervals when said punching means is inoperative and said strip may be freely advanced therethrough.

5. A machine according to claim 1, wherein said feeding means comprises reel means for supporting a supply of said strip in coiled form, braking means acting on said reel means for restraining the uncoiling of said strip, and means including follower means engaging the outside of said supply of strip, said last-named means progressively reducing the braking action of said braking means as said supply becomes depleted for maintaining a constant tension in said strip as it is uncoiled from said supply.

References Cited by the Examiner

UNITED STATES PATENTS

| | | | |
|---|---|---|---|
| 1,997,098 | 4/35 | Beegle | 153—2 |
| 2,316,801 | 4/43 | McLaughlin et al. | 153—2 |
| 2,324,115 | 7/43 | Schultz | 29—155.57 |
| 2,969,585 | 1/61 | Smith | 29—155.57 |
| 3,008,222 | 11/61 | Steinmayer | 29—155.57 |
| 3,096,805 | 7/63 | Biggs et al. | 153—2 |

CHARLES W. LANHAM, *Primary Examiner.*